United States Patent [19]

Buchwalter et al.

[11] 4,141,810

[45] Feb. 27, 1979

[54] CATIONIC ELECTRODEPOSITION USING AQUEOUS DISPERSIONS OF QUATERNARY AMMONIUM CARBONATE-CONTAINING POLYMERS

[75] Inventors: Stephen L. Buchwalter, Allison Park; Joseph F. Bosso, Lower Burrell; Roger M. Christenson, Gibsonia, all of Pa.

[73] Assignee: PPG Industries, Inc., Pittsburgh, Pa.

[21] Appl. No.: 889,311

[22] Filed: Mar. 23, 1978

Related U.S. Application Data

[62] Division of Ser. No. 744,533.

[51] Int. Cl.² ............................................. C25D 13/06
[52] U.S. Cl. .................... 204/181 C; 260/29.2 EP; 528/121; 528/404
[58] Field of Search .................................... 204/181 C

[56] References Cited

U.S. PATENT DOCUMENTS

| | | | |
|---|---|---|---|
| B 455,686 | 3/1976 | Bosso et al. | 260/29.2 EP |
| 2,676,166 | 4/1954 | Webers | 260/85.7 |
| 3,468,779 | 9/1969 | Slater et al. | 204/181 |
| 3,682,814 | 8/1972 | Gilchrist | 204/181 |
| 3,839,252 | 10/1974 | Bosso et al. | 260/29.2 EP |
| 3,962,165 | 6/1976 | Bosso et al. | 260/29.2 EP |
| 4,001,101 | 1/1977 | Bosso et al. | 204/181 |
| 4,001,155 | 1/1977 | Kempter et al. | 260/29.2 EP |
| 4,001,156 | 1/1977 | Bosso et al. | 260/29.2 EP |
| 4,071,428 | 1/1978 | Bosso et al. | 204/181 C |

*Primary Examiner*—Harold D. Anderson
*Assistant Examiner*—E. A. Nielsen
*Attorney, Agent, or Firm*—William J. Uhl

[57] ABSTRACT

A method of cationic electrodeposition on an electroconductive substrate is disclosed. The method of the invention employs as the electrocoating vehicle an aqueous dispersion of a quaternary ammonium carbonate-containing resin. Electrodeposition of the resin is accomplished without generating harmful acid from the counter ion. The carbonate counter ion is continuously evolved from the electrodeposition bath at the anode as carbon dioxide.

The quaternary ammonium carbonate-containing polymers are also useful as feed resins for controlling the pH of aqueous dispersions of acidified cationic resins used in electrodeposition. Upon electrodeposition, these resins generate acid which can build up to undesirable levels in the electrodeposition bath. The quaternary ammonium carbonate-containing polymers are relatively basic and when fed into the bath react with the acid to form the corresponding quaternary ammonium salt of the acid releasing carbon dioxide. This controls the pH of the bath and provides additional cationic resin for electrodeposition.

Utilizing the polymeric quaternary ammonium carbonates in this manner minimizes the need for controlling acid build-up in the electrodeposition bath by conventional techniques such as by treating the bath with ultrafiltration or electrodialysis.

8 Claims, No Drawings

CATIONIC ELECTRODEPOSITION USING AQUEOUS DISPERSIONS OF QUATERNARY AMMONIUM CARBONATE-CONTAINING POLYMERS

This is a division of application Ser. No. 744,533, filed Nov. 24, 1976, now U.S. Pat. No. 4,102,863 issued July 25, 1978.

BACKGROUND OF THE INVENTION

1. Field of the Invention

The present invention relates to a method of cathodically electrocoating electroconductive articles. More particularly, this invention relates to cathodically electrocoating an electroconductive article with the simultaneous decomposition of the counter ion.

2. Brief Description of the Prior Art

Cationic electrodeposition is practiced on an industrial scale and involves immersing an electroconductive article in an aqueous dispersion of a polymeric material which contains cationic groups such as quaternary ammonium salt groups or amine salt groups. An electric current is passed through the dispersion between a metallic article as cathode and a counter electrode as anode to cause a deposition of material on the cathode. During the electrodeposition, acid is generated at the counter electrode and continuously builds up in the bath where it can corrode equipment and raise the conductivity of the bath making it more difficult to electrodeposit smooth uniform coatings.

The art has recommended numerous ways to control this acid build-up such as by subjecting the bath to ultrafiltration and electrodialysis. However, these methods have shortcomings associated with them and they require additional equipment costs as well as the expense of monitoring and maintaining the additional equipment.

SUMMARY OF THE INVENTION

In the present invention, quaternary ammonium carbonate-containing resins are used as the electrocoating vehicle. The resins can be prepared by reacting an epoxy-containing polymer with an amine carbonate salt. Preferred resins are those prepared by reacting a polyglycidyl ether of a polyphenol with an amine carbonate salt, preferably a tertiary amine carbonate. When the resins are dispersed in water and an electric current passed between an electroconductive cathode and an anode in electrical contact with the resinous dispersion, the resin deposits on the cathode and the carbonate counter ion is continuously liberated from the bath at the anode as carbon dioxide.

Alternatively, the quaternary ammonium carbonate-containing resins are used as feed resins for an electrodeposition bath containing acidified cationic electrocoating resins in which the acid is not decomposable and is relatively strong, that is, has a dissociation constant of greater than $1 \times 10^{-5}$. Examples of such resins are quaternary ammonium salt-containing resins and amine salt-containing resins in which the acid is an organic acid such as lactic or acetic. When these acid-solubilized resins electrodeposit, they generate acid at the anode which does not coat out and builds up in the electrodeposition bath if not removed. The quaternary ammonium carbonate-containing polymers can be fed into the bath where they will neutralize the acid, forming the corresponding quaternary ammonium salt of the acid. This controls the pH of the bath, maintains it at acceptable levels and provides additional cationic resin for electrodeposition.

PERTINENT PRIOR ART

U.S. Pat. No. 3,839,252 to Bosso and Wismer discloses quaternary ammonium salt group-containing resins useful for electrodeposition which are prepared by reacting organic polyepoxides with amine salts in the presence of water. The acid used in preparing these salts is a relatively strong organic or inorganic acid having a dissociation constant of greater than $1 \times 10^{-5}$. The reference does not disclose the use of quaternary ammonium carbonate-containing resins.

U.S. Pat. No. 2,676,166 to Webers discloses quaternary ammonium salt group and quaternary ammonium hydroxide-containing polymers prepared by quaternizing epoxy-containing acrylic polymers with tertiary amines in the presence of acid and/or water. Amine carbonates are disclosed as being a useful acid salt in the quaternization. However, the reference does not teach the use of the resins disclosed therein for electrodeposition.

U.S. Pat. No. 3,682,814 to Gilchrist discloses aqueous dispersions of tertiary amine salt-containing polymers which are useful in electrodeposition. The acids which are used in acidifying these polymers are those which are claimed to readily decompose at the anode to yield $CO_2$ and other products. Examples given are citric acid, malic acid and carbonic acid. The reference, however, does not disclose quaternary ammonium carbonate-containing resins such as provided by the instant invention.

The difference between a quaternary ammonium carbonate-containing resin and a tertiary amine carbonate-containing resin is significant. The tertiary amine carbonate in aqueous dispersion is unstable and at normal conditions of temperature and pressure spontaneously decomposes to water and $CO_2$ which will continuously bubble out of the dispersion. This problem is acknowledged in U.S. Pat. No. 3,682,814 where it is mentioned that tertiary amine carbonate-containing resins require superatmospheric pressure in the cathode zone to maintain a stable dispersion.

The quaternary ammonium carbonate-containing resins of the present invention in aqueous dispersion are a much more stable salt which do not readily decompose under normal conditions of temperature and pressure to carbon dioxide and water. In fact, certain resins of the invention in aqueous dispersion do not decompose to $CO_2$ at 80° C. when open to the atmosphere. This stability makes electrodeposition simpler by not requiring the cathode zone to be maintained under superatmospheric pressure.

DETAILED DESCRIPTION

The quaternary ammonium carbonate-containing polymers can be formed by reacting an epoxy-containing polymeric material with a tertiary amine carbonate in the presence of water.

The epoxy-containing polymer is a resinous polyepoxide, that is, a polymeric resinous material containing two or more epoxy groups per molecule. The preferred polyepoxides are polyglycidyl ethers of polyphenols such as Bisphenol A. These can be produced, for example, by etherification of a polyphenol with an epihalohydrin or dihalohydrin such as epichlorohydrin or dichlorohydrin in the presence of alkali. The polyphenol may be, for example, bis-2,2-(4-hydroxyphenyl)propane, 4,4'-dihydroxybenzophenone, bis-1,1-(4-hydroxyphenyl)ethane, bis-1,1-(4-hydroxyphenyl)isobutane, bis-2,2-(4-hydroxytertiarybutyl-phenyl)propane, bis(2-hydroxynaphthyl)methane, 1,5-dihydroxynaphthalene or the like.

While the polyglycidyl ethers of the polyphenols may be employed per se, it is frequently desirable to react a portion of the reactive sites (i.e., hydroxyl) with a modifying material to vary the film characteristics of the polymer. The esterification of the epoxy-containing polymers with carboxylic acids, especially fatty acids, is well known in the art and need not be discussed in detail. Especially preferred are saturated fatty acids, and especially pelargonic acid. Likewise, the epoxy resin may be modified with isocyanate group-containing organic materials such as half-capped diisocyanates such as disclosed in U.S. Pat. No. 3,922,253 to Jerabek and Marchetti.

Another quite useful class of polyepoxides are produced from novolak resins or similar polyphenol resins.

Also suitable are similar polyglycidyl ethers of polyhydric alcohols which may be derived from such polyhydric alcohols as ethylene glycol, diethylene glycol, triethylene glycol, 1,2-propylene glycol, 1,3-propylene glycol, 1,5-pentanediol, 1,2,6-hexanetriol, glycerol, bis-2,2-(4-hydroxycyclohexyl)propane and the like.

There can also be used polyglycidyl ethers of polycarboxylic acids which are produced by the reaction of epichlorohydrin or a similar epoxy compound with an aliphatic or aromatic polycarboxylic acid such as succinic acid, glutaric acid, terephthalic acid, 2,6-naphthalene dicarboxylic acid, dimerized linolenic acid and the like. Examples are polyglycidyl adipate and polyglycidyl phthalate.

The preferred epoxy-containing polymeric materials are polyglycidyl ethers of polyphenols, particularly Bisphenol A. The products are preferably further reacted to chain extend and increase their molecular weight. For example, they may be further reacted with active hydrogen-containing materials, which are reactive with epoxy groups such as those containing —OH, —SH, —COOH, =NH groups. Preferred chain extenders are organic polyols. Chain extending of epoxy-containing polymeric materials with organic polyols including polymeric polyols is disclosed in U.S. patent application Ser. No. 648,982 to Marchetti, Zwack and Jerabek, on page 6, line 8, continuing through to page 11, line 7.

Besides the polyglycidyl ethers mentioned above, other epoxy-containing polymers which may be employed are acrylic polymers which contain epoxy groups. These polymers are formed by polymerizing an unsaturated epoxy-containing monomer such as glycidyl acrylate or methacrylate by itself or with one or more other polymerizable ethylenically unsaturated monomers.

Examples of other ethylenically unsaturated polymerizable epoxy-containing monomers are allyl glycidyl ether, 4-vinyl cyclohexene monoepoxide, butadiene monoepoxide, vinyl glycidyl phthalate, allyl glycidyl maleate, allyl glycidyl phthalate and the like.

Examples of other ethylenically unsaturated polymerizable monomers are those having at least one $CH_2=CH<$ group. Examples of such monomers include vinyl acetate, methyl acrylate, ethyl acrylate, methyl methacrylate, acrylamide, methacrylamide, acrylonitrile, methacrylonitrile, styrene, 1,3-butadiene, isoprene, 2-chloro-1,3-butadiene, vinyl chloride, vinyl fluoride, isopropenyl acetate, vinylidene chloride, methyl vinyl ether, acrolein, methyl vinyl ketone, hydroxyethyl acrylate or methacrylate and hydroxypropyl acrylate or methacrylate.

The epoxy-containing acrylic polymers are prepared by techniques well known in the art. The acrylic monomers are usually polymerized either in bulk or in solvent using a free radical producing catalyst such as a peroxide-type catalyst or an azo compound. Examples of suitable catalysts are tertiary butyl peroxide and 2,2'-azobisisobutyronitrile. Usually, to control molecular weight, a chain transfer agent such as tertiary dodecyl mercaptan is also employed.

The tertiary amine carbonate which is reacted with the epoxy-containing polymers can be prepared in various ways. For example, the tertiary amine can be dispersed or dissolved in water in an open reaction vessel and carbon dioxide bubbled through or added in the form of dry ice. The gain in weight of the aqueous dispersion or solution can be monitored to determine the extent of carbonate formation. Alternately, the reaction vessel can be pressurized, for example, by introducing the carbon dioxide into a sealed reaction vessel to prevent its escape.

It should be mentioned at this point that although the specification and claims refer to polymeric quaternary ammonium carbonates, the polymer may also contain some bicarbonate as the counter ion. Therefore, the expression quaternary ammonium carbonates is intended to cover polymers containing carbonate, bicarbonate, and mixtures of the two as counter ions of the quaternary ammonium group.

The tertiary amines which may be used may be unsubstituted or substituted with constituents such as hydroxyl as long as the substituent does not interfere with the reaction of the amine carbonate and the epoxy-containing polymer and the substituents are of such a nature or employed under conditions such that they will not gel the reaction mixture. The preferred amines are tertiary amines, and examples include dimethylethanolamine, triethylamine, trimethylamine, triisopropylamine and the like. Examples of other tertiary amines are disclosed in U.S. Pat. No. 3,839,252 to Bosso and Wismer in column 5, line 3, through column 7, line 42.

The tertiary amine carbonate and the epoxy-containing polymer are reacted by mixing the components in the presence of a controlled amount of water. The reaction temperature may be varied over a fairly wide temperature range and depends on the pressure imposed on the system. For example, at atmospheric pressure, reaction temperatures as low as 25° C. and as high as 90° C. can be used. If, however, reaction is conducted in a sealed reactor, higher temperatures can be used, for example, from 90° to 120° C.

Water is usually present in the reaction to control the exotherm that is generated upon quaternization. The amount of water employed should be that amount which allows for smooth reaction but not sufficient to cause extremely slow or no reaction. Typically, the water is employed on the basis of about 2 percent or about 20 percent by weight based on total reaction mixture solids.

In conducting a quaternization reaction, a co-solvent is not necessary, although one is often used in order to afford better control of reaction. Monoalkyl and monoaryl ethers of ethylene glycol are suitable co-solvents.

With regard to the amount of tertiary amine carbonate and epoxy-containing polymer which are reacted with one another, the relative amounts can be varied and depend on the extent of quaternization desired, and this in turn will depend on the molecular weight and structure of the epoxy-containing polymer. The extent of quaternization, the molecular weight and structure of the epoxy-containing polymer should be selected such that when the quaternary ammonium carbonate-containing polymer is mixed with an aqueous medium to form an electrodeposition bath, a stable dispersion will form. A stable dispersion is one which does not sediment or is one which is easily redispersed if some sedimentation occurs. In addition, the dispersion should be of sufficient cationic character that the dispersed resin particles will migrate towards the cathode when an electrical potential is impressed between an anode and a cathode immersed in the aqueous dispersion. Also, the molecular weight, structure and extent of salt formation should be controlled so that the dispersed resin will have the required flow to form a continuous, self-insulating film on the cathode. The film must be insensitive to moisture to the extent that it will not redissolve in the electrodeposition bath, or be rinsed away from the coated cathode after its removal from the bath.

The structure, molecular weight and degree of quaternization are dependent on one another and the selection of one can only be made after a consideration of the other two. For example, because of flow considerations, the quaternary ammonium carbonate-containing polymers prepared from polyglycidyl ethers of polyphenols should be of lower molecular weight than many of the epoxy-containing acrylic polymers mentioned above. In addition, high molecular weight polymers usually require higher quaternary ammonium carbonate contents than lower molecular weight polymers unless the polymers contain hydrophilic groups such as polyoxyalkylene moieties.

In general, however, most of the quaternary ammonium carbonate-containing polymers useful in the practice of the present invention have a molecular weight within the range of 500 to 60,000 and contain from about 0.01 to 10 milliequivalents of quaternary nitrogen base group per gram of resin solids. Obviously, one must use the skill of the art to couple the molecular weight with the quaternary nitrogen base group content to arrive at a satisfactory polymer. With regard to the quaternary ammonium carbonate-containing polymers prepared from the preferred polyglycidyl ethers of polyphenols, the molecular weight of the preferred polymers will be within the range of 500 to 10,000, preferably 1000 to 5000. These preferred polymers will contain from 0.01 to 8.0, preferably 0.05 to 6.0 milliequivalents of quaternary nitrogen base group per gram of polymer.

When it is desired that the quaternary ammonium carbonate-containing resins contain free epoxy groups, the ratio of starting organic epoxy-containing polymer to tertiary amine carbonate is selected so as to provide an excess of epoxy groups, thereby producing a resin containing free unreacted epoxy groups. Epoxy-free resins can be prepared by reacting the stoichiometric amounts of tertiary amine carbonate with the available epoxy groups. Epoxy-free resins can also be provided by preparing epoxy-containing reaction products and post-reacting the epoxy groups with active hydrogen-containing materials such as fatty acids, phenols and mercaptans.

Quaternary ammonium carbonate-containing polymers could also be prepared with primary and secondary amines. This could be accomplished by either of two different methods. In the first, a primary or secondary amine is saturated with carbon dioxide as described above. The amine carbonate is then reacted with a resinous polyepoxide. Sufficient epoxy functionality must be present such that a quaternary ammonium carbonate is eventually formed. Part of the epoxy functionality may be supplied by a monomeric epoxide such as propylene oxide.

In the second method, a primary or secondary amine is reacted with a resinous polyepoxide. Sufficient epoxy functionality must be present such that all amine functionality is converted to tertiary amine. Adding carbon dioxide as described above forms a tertiary amine carbonate, which upon heating to a suitable reaction temperature as described below reacts with additional epoxy groups to form the quaternary ammonium carbonate-containing polymer. The additional epoxy groups may be from the resinous polyepoxide or from a monomeric epoxide such as propylene oxide.

When using primary or secondary amines, some precautions have to be taken to avoid gelation of the resin. Because primary and secondary amines are polyfunctional, the molecular weight of the resinous polyepoxide should be low so that the increase in molecular weight is not excessive. Also, epoxy-epoxy reactions should be minimized by slowly adding the polyepoxide to the amine so that the concentration of epoxy groups in the presence of amine is kept low. Finally, the use of monomeric epoxide instead of polyepoxide in the quaternization step helps to avoid gelation by keeping the molecular weight manageable.

Quaternary ammonium carbonate-containing resins can also be prepared from quaternary ammonium hydroxide-containing resins. To form the latter, a tertiary amine is reacted with a resinous polyepoxide in the presence of water as is disclosed in U.S. Pat. No. 4,081,341. The quaternary ammonium hydroxide-containing resin is then converted to the corresponding carbonate by the addition of carbon dioxide. This method is considered to be an equivalent to the method of reacting the epoxy-containing polymers with an amine carbonate salt.

The quaternary ammonium carbonate-containing polymers can be used as the sole cationic electrocoating vehicle themselves, or they can be used in combination with other acid-solubilized cationic electrocoating resins.

Use of the quaternary ammonium carbonate-containing polymers as a sole electrocoating vehicle is desirable because the polymers electrodeposit on the cathode while the carbonate counter ion migrates toward the anode where it is continuously evolved from the bath as carbon dioxide. Thus, there is essentially no counter ion-derived acid build-up in the electrodeposition bath.

The quaternary ammonium carbonate-containing polymers can be used in combination with other acid-solubilized cationic resins well known in the art for electrodeposition. When these acid-solubilized cationic resins electrodeposit, they generate acid which does not coat out and builds up in the electrodeposition bath if not removed. Quaternary ammonium carbonate-containing polymers can be added to the electrodeposition bath where they will neutralize the acid and form the corresponding quaternary ammonium salt of the free acid.

Examples of acidified cationic electrodeposition resins are amine salt-containing polymers and quaternary ammonium salt group-containing polymers which are acidified with a relatively strong acid, that is, an acid having dissociation constants greater than $1 \times 10^{-5}$.

Examples of amine salt-containing polymers are those prepared by reacting an organic epoxy-containing polymer such as described above with a secondary amine in the presence of an organic solvent to form the tertiary amine. The tertiary amine-containing adducts can then be acidified to form the salt. Such resins are described in U.S. Pat. No. 3,984,299 to Jerabek; U.S. Pat. No. 3,947,338 to Jerabek and Marchetti and U.S. Pat. No. 3,947,339 to Jerabek, Marchetti and Zwack.

Examples of quaternary ammonium salt group-containing polymers are those prepared by reacting an epoxy-containing polymer such as those described above with a tertiary amine salt in the presence of water. These polymers are described in U.S. Pat. No. 3,839,252 to Bosso and Wismer.

A preferred use of the quaternary ammonium carbonate-containing polymers is as a feed resin to an electrodeposition bath which contains one of the other acid-solubilized resinous vehicles mentioned above. When fed into an electrodeposition bath employing these particular resinous vehicles, the quaternary ammonium carbonate-containing resin will control the pH of the electrodeposition bath by neutralizing the acid that is generated during the electrodeposition process and will also act as a replenishment resin. When used as a feed or replenishment resin, the quaternary ammonium carbonate-containing polymer is preferably of the same structure and molecular weight as the strong acid-solubilized resin originally used in the bath, with the obvious exception that the feed resin contains carbonate counter ion instead of the counter ion present in the acid-solubilized resin.

When the quaternary ammonium carbonate-containing resin is used as the sole feed or replenishment resin, some additional acid can also be added to the bath or the quaternary ammonium carbonate-containing resin can be partially neutralized with acid before adding the resin to the bath to compensate for the acid removed from the bath by evaporation and drag-out.

Besides being used as the sole replenishment resin, the quaternary ammonium carbonate-containing resin can be used as a partial replacement resin along with other acid-solubilized resinous electrocoating vehicles which may have the same or different structures and molecular weights. The quaternary ammonium carbonate-containing resin can be fed into the electrodeposition bath in a manner well known in the art; it being important that the addition does not cause bath instability. For example, it can be premixed with paint withdrawn from the bath and the mixture added. Addition can be either on a continuous or incremental basis as is well known in the art.

The electrodeposition baths used in the practice of the invention have the resinous coating vehicles in the form of an aqueous dispersion. The term "dispersion" as used within the context of the present invention is believed to be a transparent, translucent or opaque aqueous resinous system in which the resin is in the dispersed phase and water in the continuous phase. The average particle size diameter of the resinous phase is generally less than 10, preferably less than 5 microns.

The concentration of the resinous products in the aqueous medium depends upon process parameters to be used and is, in general, not critical, but ordinarily a major portion of the aqueous dispersion is water. For example, aqueous dispersions preferably contain from 1 to 50 percent by weight resin solids.

Besides water, the aqueous medium may contain a coalescing solvent. The use of a coalescing solvent may be, in some instances, for improved deposited film appearance. These solvents include hydrocarbons, alcohols, esters, ethers and ketones. The preferred coalescing solvents include monoalcohols, glycols and polyols, as well as ketones and other alcohols. Specific coalescing solvents include isopropanol, butanol, isophorone, 4-methoxymethyl-2-pentanone, ethylene and propylene glycol, the monoethyl, monobutyl and monohexyl ethers of ethylene glycol and 2-ethylhexanol. The amount of coalescing solvent is not unduly critical and is generally between about 0.01 and 40 percent by weight, preferably about 0.5 to about 25 percent by weight based on total weight of the aqueous medium. In some instances a pigment composition and, if desired, various additives such as surfactants or wetting agents are included in the dispersion. Pigment compositions may be any of the conventional type comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as the pigment-to-resin ratio. In the practice of the present invention, pigment-to-resin ratios within the range of 0.01 to 5:1 are usually used. The other additives mentioned above are present in the dispersion in amounts of 0.01 to 3 percent by weight based on total weight of resin solids.

The aqueous dispersion can also contain a curing agent for the electrocoating vehicle. Many of the electrocoating vehicles employed in the practice of the invention will contain active hydrogens such as hydroxyl and/or amine groups. In these instances the curing agents should be those which are reactive with the active hydrogens. Examples include blocked isocyanates, phenolic and amine-aldehyde condensates. Examples of some of these curing agents in cationic electrodeposition are found in U.S. Pat. No. 3,984,299 to Jerabek; U.S. Pat. No. 3,947,338 to Jerabek and Marchetti and U.S. Pat. No. 3,937,679 to Bosso and Wismer.

In the electrodeposition process employing the aqueous dispersions described above, the aqueous dispersion is placed in contact with an electrically conductive anode and an electrically conductive cathode with the surface to be coated being the cathode. While in contact with the aqueous dispersion, an adherent film of the coating composition is deposited on the cathode when a voltage is impressed between the electrodes.

The conditions under which electrodeposition is carried out are, in general, similar to those used in electrodeposition of other types of coatings. The applied voltage may be varied and can be, for example, as low as one volt or as high as several thousand volts, but typically between 50 and 500 volts. The current density is usually between 1.2 amperes and 15 amperes per square foot and tends to decrease during electrodeposition indicating the formation of a self-insulating film. The method of the invention is applicable to coatings with any electrically conductive substrate, especially metals such as steel, aluminum, copper, magnesium and the like, but also including metallized plastic and conductive carbon-coated materials. After electrodeposition, the coating is cured, usually by baking at elevated temperatures; temperatures of from about 90° to 260° C. for about 1 to 30 minutes are typical.

Illustrating the invention are the following examples, which, however, are not to be construed as limiting the invention to their details. All parts and percentages in the examples, as well as throughout the specification, are by weight unless otherwise indicated.

EXAMPLE I

The following shows the preparation of a quaternary ammonium carbonate resin by reacting an epoxy-containing polymer with a tertiary amine carbonate. The epoxy-containing polymer was prepared from the following charge:

| Ingredient | Parts by Weight |
|---|---|
| EPON 829[1] | 1389.6 |
| Bisphenol A | 448.6 |
| neopentylglycol adipate polyester (molecular weight 530) | 380 |
| TEXANOL[2] | 178 |
| benzyldimethylamine catalyst | 4.7 |
| 88% by weight aqueous lactic acid solution | 5.4 |
| phenyl CELLOSOLVE[3] | 462.0 |
| FOAMKILL 639[4] | 12.0 |
| methyl ethyl ketone | 365.0 |

[1]Epoxy resin solution formed from reacting epichlorohydrin and Bisphenol A having an epoxy equivalent of 193-203.
[2]2,2,4-trimethylpentanediol monoisobutyrate.
[3]Ethylene glycol monophenyl ether.
[4]Hydrocarbon oil-containing inert diatomaceous earth.

The EPON 829 and Bisphenol A were charged to a reaction vessel and heated to exotherm at 150° C. and then held at 150° C. for 1 hour. The reaction mixture was cooled to 130° C. and charged with the neopentylglycol adipate and TEXANOL. The benzyldimethylamine was added and the reaction mixture heated to 130° C. and held for about 4½ hours at a temperature of approximately 130°-140° C. The Gardner-Holdt viscosity at this time was U+. The reaction mixture was then cooled to 140° C., the lactic acid added to neutralize the benzyldimethylamine catalyst and the phenyl CELLOSOLVE, FOAMKILL 639 and methyl ethyl ketone added to the reaction mixture.

The carbonate salt of dimethylethanolamine was prepared from the following charge:

| Ingredient | Parts by Weight |
|---|---|
| dimethylethanolamine | 500 |
| deionized water | 310 |
| $CO_2$ | 120 (weight gain) |

The dimethylethanolamine and water were charged to a reaction vessel and carbon dioxide bubbled into the reaction vessel for about 8½ hours. The weight gain in the reaction vessel was about 110 parts by weight. The bubbling of this $CO_2$ was continued for about 14 hours and the weight gain was determined to be 120 parts by weight. The theoretical weight gain for complete carbonation is 123 parts by weight. The solution contained 66.7 percent by weight tertiary amine carbonate, based on the charge and weight gain.

The neopentylglycol adipate chain-extended epoxy resin prepared as described above was quaternized with the dimethylethanolamine carbonate salt in the following charge ratio:

| Ingredient | Parts by Weight | |
|---|---|---|
| epoxy-neopentylglycol adipate reaction mixture | 443.5 | (296.2 solids) |
| dimethylethanolamine carbonate | 31 | (20.6 parts solids) |
| deionized water | 89 | |

The ingredients were cold blended with one another and charged to a pressure bomb, the pressure bomb sealed and put in a rocker oven at 85° C. Reaction was continued for about 5½ hours at 92°-94° C. The resin had an infinite epoxy equivalent at 68.9 percent by weight total solids and contained 0.326 milliequivalents of quaternary nitrogen per gram of resin (at 68.9 percent by weight total solids) which was 82 percent of the theoretical quaternary nitrogen value.

One hundred sixty-six parts by weight (100 parts by weight solids) of the quaternary ammonium carbonate resin prepared as described above was thinned with 20 parts by weight of methyl ethyl ketone and dispersed in 841 parts by weight of deionized water to form an electrodeposition bath. In forming the dispersion, the water was heated to 50° C. and the resin and methyl ethyl ketone were cold blended with one another and added to the water with stirring. An excellent dispersion having a pH of 8.2 was obtained.

Zinc phosphated steel panels were cathodically electrocoated in this electrodeposition bath at 150 volts for 90 seconds, bath temperature 77° F. (25° C.) to form a self-insulating film having a thickness of about 0.8 mils. The coated steel panels were baked at 400° F. (204° C.) for 20-30 minutes to give a hard textured coating.

EXAMPLE II

A quaternary ammonium carbonate-containing resin similar to that of Example I was prepared by reacting an epoxy-containing polymer with a tertiary amine carbonate in an open reaction vessel, instead of conducting the reaction under pressure such as was done in Example I.

The epoxy-containing resin was prepared as generally described in Example I from the following charge:

| Ingredient | Parts by Weight | Solids |
|---|---|---|
| EPON 829 | 1709.5 | 1641.2 |
| Bisphenol A | 294 | 294.0 |
| neopentylglycol adipate polyester (molecular weight = 530) | 674.5 | 674.5 |
| TEXANOL | 100 | — |
| dimethylethanolamine (catalyst) | 5.1 | 5.1 |
| 88% by weight aqueous lactic acid solution | 5.9 | 5.2 |
| methyl ethyl ketone | 1088 | — |

The epoxy-containing resin was quaternized by blending it with 89.7 parts by weight (64.6 parts by weight solids) of dimethylethanolamine carbonate (prepared as described in Example I) and 193.7 parts by weight of deionized water and 12 parts by weight of FOAMKILL 639. Immediately after blending, carbon dioxide was sparged through the reaction mixture for 1 hour at room temperature, followed by heating the reaction mixture to 85° C. over a period of 2 hours. The reaction was then cooled to room temperature.

The quaternized resin had a 1660 epoxy equivalent at 64.8 percent total solids and contained 0.144 milliequivalents of quaternary nitrogen per gram of resin (at 64.8 percent by weight total solids) which was 95 percent of the theoretical quaternary nitrogen value.

Two hundred seventy-six (276.9) parts by weight (180.0 parts by weight solids) of the quaternary ammonium carbonate-containing resin prepared as described above was blended with 1590.6 parts by weight of deionized water and 7.5 parts by weight of a butylated melamine crosslinking agent sold commercially by American Cyanamid Company as CYMEL 1156 to form an electrodeposition bath. Zinc phosphated steel panels were cathodically electrocoated in this bath at 250 volts for 90 seconds at a bath temperature of 27° C. to form a self-insulating thick film which had large craters due to the lack of coalescing solvents.

EXAMPLE III

A quaternary ammonium carbonate-containing resin was also used as a feed resin to control the pH of an electrodeposition bath which contained an acidified cationic resinous coating vehicle and excess acid.

The acidified resinous coating vehicle was a quaternary ammonium lactate-containing resin prepared by reacting an epoxy-containing polymer with dimethylethanolamine lactate. The epoxy-containing polymer was prepared from the following charge ratio:

| Ingredient | Parts by Weight | Solids |
| --- | --- | --- |
| EPON 829 | 1709.5 | 1641.2 |
| Bisphenol A | 294.0 | 294.0 |
| polypropylene glycol, molecular weight 600 | 770.3 | 770.3 |
| dimethylethanolamine catalyst | 5.1 | 5.1 |
| lactic acid | 9.8 | 8.6 |
| TEXANOL | 500.0 | — |
| isopropanol | 95.0 | — |
| FOAMKILL 639 | 17.9 | 17.9 |

The EPON 829 and Bisphenol A were charged to a reaction vessel under a nitrogen atmosphere and heated to exotherm and held at 155°–160° C. for about 1 hour. The reaction mixture was then cooled to 140° C. and the polypropylene glycol added, followed by the addition of the dimethylethanolamine. The temperature of the reaction mixture was maintained at 130°–140° C. for about 4 hours until a Gardner-Holdt viscosity of M was obtained. The lactic acid, TEXANOL, isopropanol and FOAMKILL 639 were then added to the reaction mixture.

The epoxy resin prepared as described above was then quaternized by adding to the reaction mixture 151 parts by weight (113.2 parts by weight solids) of aqueous dimethylethanolamine lactate. The reaction mixture was held at 85°–95° C. for two hours to effect quaternization. The reaction mixture was then thinned with 300 parts by weight of deionized water which contained 3.7 parts by weight of boric acid. A melamineformaldehyde curing agent, CYMEL 1156, 126.9 parts, was added to the reaction mixture followed by thinning with 45.7 parts be weight of isopropanol and 11.4 parts by weight of methyl ethyl ketone. Two hundred and eighty parts by weight (182 parts by weight solids) of a methylolphenolether (METHYLON 75202) was added to the reaction mixture which was finally thinned with 13.3 parts by weight of methyl ethyl ketone.

Four hundred twenty-three parts by weight (300 parts by weight solids) of the quaternary ammonium lactate-containing resin prepared as described immediately above was thinned with 2577 parts by weight of deionized water to form a 10 percent solids electrodeposition bath which had a pH of 6.4. Zinc phosphated steel panels were cathodically electrocoated from this bath at 250 volts for 90 seconds at a bath temperature of 27° C. to form a self-insulating film. The film was then baked at 485° F. (252° C.) for 25 minutes to form a smooth solvent-resistant coating.

Three (3.4) parts of lactic acid was added to the electrodeposition bath to simulate the acid build-up which would occur in the bath during an actual electrodeposition process. The addition of the lactic acid lowered the pH to 3.1.

To the acidified electrodeposition bath was added 1675 parts by weight of the electrodeposition bath of the quaternary ammonium carbonate-containing resin prepared in Example II. The pH of the mixture increased to 6.1. Zinc phosphated steel panels were cathodically electrocoated from this mixture at 250 volts for 90 seconds at a bath temperature of 27° C. to form a thick, self-insulating film. The film was then baked at 485° F. (252° C.) for 20 minutes to form a smooth, solvent-resistant coating. This coating was comparable to that obtained from the bath before adding excess lactic acid except for some excess flow.

EXAMPLE IV

A quaternary ammonium carbonate-containing resin similar to that of Example II was prepared by reacting an epoxy-containing polymer with a tertiary amine carbonate in an open reaction vessel.

The epoxy-containing polymer was prepared as generally described in Examples I, II and III from the following charge:

| Ingredient | Parts by Weight | Solids |
| --- | --- | --- |
| EPON 829 | 1390 | 1333 |
| Bisphenol A | 449 | 449 |
| neopentylglycol adipate polyester, molecular weight 530 | 380 | 365 |
| benzyldimethylamine catalyst | 5.7 | 5.7 |
| TEXANOL | 178 | — |
| phenyl CELLOSOLVE | 462 | — |
| FOAMKILL 639 | 12 | — |
| methyl ethyl ketone | 365 | — |

The epoxy resin prepared from the above charge was thinned with an additional 150 parts by weight of methyl ethyl ketone and then cold blended with 117 parts (115.4 parts by weight solids) of dimethylethanolamine carbonate and 50 parts by weight of deionized water. Quaternization was effected as generally described in Example II in an open reaction vessel while sparging carbon dioxide through the reaction mixture. The resultant resinous dispersion has a pH of 7.7, an epoxy equivalent of 8022 at 63 percent solids and contained 0.279 milliequivalents of quaternary nitrogen per gram of resin at 66.3 percent total resin solids which is 97 percent of the theoretical value.

Three hundred fourteen parts by weight (200 parts by weight solids) of the quaternized resin prepared as described immediately above was combined with 1900 parts by weight of deionized water to form an electrodeposition bath of approximately 10 percent solids. The dispersion was filtered to remove a small amount of large sediments and then zinc phosphated steel panels were cathodically electrodeposited in this bath at 150 volts for 90 seconds at a bath temperature of 25° C. to form a self-insulating film. The coated steel panels were baked at 385° F. (196° C.) for 30 minutes to give smooth, hard films of approximately 0.9 mil thickness.

To show the thermal stability of the quaternary ammonium carbonate-containing resins of the invention, 800 parts of the electrodeposition bath prepared as described above was charged to a reaction vessel and heated to 80° C. over a period of about 1¾ hours and then cooled to room temperature. The pH of the electrodeposition bath was changed very little by this treatment—7.4, compared to its initial value of 7.9.

Zinc phosphated steel panels were then cathodically electrocoated with the electrodeposition bath heated as described above. Electrodeposition was conducted at 150 volts for 90 seconds at a bath temperature of 27° C. to give a self-insulating film. The coated steel panels were baked at 385° F. (196° C.) for 30 minutes to give smooth, hard films of about 0.9 mil in thickness which were similar in appearance to the films produced in the electrodeposition bath before heating.

Three (3.4) parts by weight of lactic acid were added to the dispersion and 305 milliliters of gas was collected over water in an inverted graduated cylinder connected to the reaction vessel with TYGON® tubing. The amount of quaternary ammonium carbonate in the resin is 0.421 milliequivalents per gram of resin based on the analytical results for quaternary nitrogen corrected to 100 percent solids. This value corresponds to 0.210 milliequivalents of carbon dioxide per gram of resin. So for 80 grams of resin (10 percent of the bath), one calculates 16.80 millimoles or approximately 410 milliliters of gas, assuming 25° C. and one atmosphere.

The actual volume of gas evolved on neutralizaton with lactic acid was 305 milliliters. This result indicates that at least 75 percent of the carbon dioxide was retained during heating. This result is not corrected for leakage or dissolution in the water, each of which would raise the volume of carbon dioxide collected closer to the theoretical value.

We claim:

1. In a method of coating a conductive substrate serving as a cathode which method comprises passing an electric current between an anode and said cathode in electrical contact with a water-dispersed composition of a quaternary ammonium salt group-containing resin, the improvement wherein the quaternary ammonium salt group is a quaternary ammonium carbonate.

2. The method of claim 1 in which the quaternary ammonium salt group-containing resin is prepared by reacting an epoxy-containing polymer with a tertiary amine carbonate.

3. The method of claim 2 in which the polyepoxide is a polyglycidyl ether of a polyphenol.

4. A method for cathodically electrodepositing a coating on a conductive article which comprises the steps of:
   (A) immersing a conductive article in an aqueous dispersion which contains an acidified cationic resinous vehicle, said acid having a dissociation constant of greater than $1 \times 10^{-5}$,
   (B) passing an electric current through the aqueous dispersion between a conductive article as cathode and another electrode as anode to deposit the resinous coating vehicle on the cathode and to generate acid at the anode,
   (C) feeding into said aqueous dispersion a polymeric quaternary ammonium carbonate,
   (D) reacting said polymeric quaternary ammonium carbonate with said acid to form the corresponding quaternary ammonium salt of said acid.

5. The method of claim 4 in which an acid having a dissociation constant greater than $1 \times 10^{-5}$ is fed into said aqueous dispersion, said acid being sufficient to maintain the total amount of acid in the bath at an essentially constant level.

6. The method of claim 4 in which the acidified cationic resinous vehicle is selected from the class consisting of amine acid salts and quaternary ammonium salt group-containing resins.

7. The method of claim 4 in which a quaternary ammonium carbonate is formed from reacting an epoxy-containing polymer with tertiary amine carbonate.

8. The method of claim 7 in which the epoxy-containing polymer is a polyglycidyl ether of a polyphenol.

* * * * *

UNITED STATES PATENT AND TRADEMARK OFFICE
CERTIFICATE OF CORRECTION

PATENT NO. : 4,141,810
DATED : February 27, 1979
INVENTOR(S) : Stephen L. Buchwalter et al It is certified that error appears in the above-identified patent and that said Letters Patent are hereby corrected as shown below:

Column 3, line 27, "ethers" should be --esters--.

Signed and Sealed this

Twenty-ninth Day of May 1979

[SEAL]

Attest:

RUTH C. MASON
Attesting Officer

DONALD W. BANNER
Commissioner of Patents and Trademarks